United States Patent [19]

Benjamin et al.

[11] 4,090,037
[45] May 16, 1978

[54] TELEPHONE SET

[76] Inventors: Jack W. Benjamin, 257-27 149th Rd., Rosedale, N.Y. 11422; Samson Helfgott, 611 Caffrey Ave., Far Rockaway, N.Y. 11691

[21] Appl. No.: 613,087

[22] Filed: Sep. 15, 1975

[51] Int. Cl.² ............................................. H04M 1/44
[52] U.S. Cl. ........................... 179/90 AN; 179/90 BD
[58] Field of Search ............ 179/90 AN, 90 B, 2 DP, 179/90 D

[56] References Cited

U.S. PATENT DOCUMENTS

| 2,874,672 | 2/1959 | Hamm, Jr. | 179/90 AN |
|---|---|---|---|
| 3,636,319 | 1/1972 | Nixon | 179/90 AN |
| 3,674,941 | 7/1972 | Guetta | 179/90 AN |
| 3,702,903 | 11/1972 | Barton | 179/18 DA |
| 3,760,121 | 9/1973 | Nissim | 179/90 AN |
| 3,920,926 | 11/1975 | Lenaerts et al. | 179/90 B |
| 3,932,709 | 1/1976 | Hoff et al. | 179/90 B |

Primary Examiner—Kathleen H. Claffy
Assistant Examiner—Gerald L. Brigance

[57] ABSTRACT

A telephone set having an optical readout of the telephone number which is entered onto the telephone set. An optical display is electrically coupled by means of a control circuit to the standard telephone dialing circuit such that the number dialed onto the telephone set is displayed on the optical display. The optical display can be included directly in the telephone set housing or can be provided as an attachment to the telephone set housing. A memory storage is provided which can temporarily store the number until the user has checked that the entire number is correct and then the number will be transmitted onto the telephone line.

10 Claims, 6 Drawing Figures

TELEPHONE SET

BACKGROUND OF THE INVENTION

This invention relates to telephone sets and more particularly to an optical display for displaying a telephone number as it is dialed.

One of the basic cost problems in the use of telephone equipment is the dialing of a wrong number. In most cases, the person dialing the number knows the correct number which he desires but erroneously dials the number in error. Such errors can occur both with the use of the standard dialer as well as with the use of the pushbutton on the Touch Tone sets. The dialing of the wrong number connects the telephone set to a wrong party. In most cases the telephone companies will give the subscriber a credit for the wrong number. However, although the subscriber may not be charged for the call, nevertheless the telephone company must bear the costs of such wrong numbers.

Additionally, when dialing a wrong number and not receiving an answer, the subscriber does not really know that he has dialed a wrong number and erroneously believes that the party he desires to reach is not at home. Such costs and misleading information resulting from the erroneous dialing of a number could be avoided if the subscriber were made aware of the number which he had dialed prior to completing his call.

Accordingly, it is an object of the present invention to avoid the aforementioned problems of existing telephone equipment.

Another object of the present invention is to provide a telephone set having an optical readout of the number entered and being dialed.

Still a further object of the present invention is to provide an attachment for a telephone set which provides an optical readout of the number being dialed on the telephone set.

Yet a further object of the present invention is to provide a telephone set attachment which gives an optical readout of the entire number prior to the number being transmitted onto the telephone line.

Still another object of the present invention is to provide an attachment for a telephone set which includes an optical display of the number entered and a memory means for retaining the number dialed such that subsequent transmission of the number can be achieved without the necessity of redialing the number.

Still a further object of the present invention is to provide an optical readout attachment for a telephone set which can recognize the dialing of an area code and can insert a dash in the optical readout at the appropriate position.

A further object of the present invention is to provide an attachment for a telephone set giving an optical readout of the telephone number entered wherein the last digit entered can be cleared while retaining all previously dialed digits.

Another object of the present invention is to provide an attachment for a telephone set which provides an optical readout of the telephone number entered and which includes a clearing circuit to permit clearing of a number should an error in the dialing be detected by the subscriber.

These and other objects and features of the invention will be apparant from the following description of the invention.

SUMMARY OF THE INVENTION

Briefly, the invention provides a telephone set having a telephone set housing means which includes all of the circuitry needed for the invention. Such circuitry includes a standard telephone dialing circuit means for entering a telephone number onto a telephone line. A numeric optical display means is also contained in the telephone set housing and is viewable externally from the housing means. A control circuit means is included in the housing means which couples the telephone dialing circuit means to the opitcal display means. The control circuit means is responsive to the numbers which are entered by the dialing circuit means onto the telephone set, and controls the display means to optically display the numbers entered.

In another embodiment of the present invention, the optical readout and associated circuitry is provided in a separate housing means which can be attached to the standard telephone set.

DETAILED DESCRIPTION OF THE INVENTION

Figure 1:
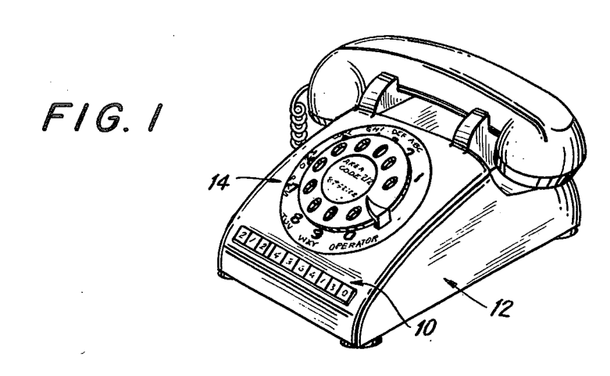
FIG. 1 is an isometric view of a telephone set incorporating the present invention.

The present invention provides an optical readout of the telephone number which is entered on a telephone set. The optical readout is provided by means of an optical display means shown generally at 10 wherein the numbers which are entered onto the telephone set appear as they are dialed. The optical display 10 can be incorporated directly in the telephone set housing shown generally at 12, as is depicted in FIG. 1. In such embodiment, the optical display can be placed in a position to permit viewing by the subscriber, for example, beneath the dial 14. However, other positions on the housing can also be utilized depending upon the size and shape of the telephone set housing unit. In such cases the optical display would be built into the telephone set together with all of the circuitry associated therewith.

Figure 2:
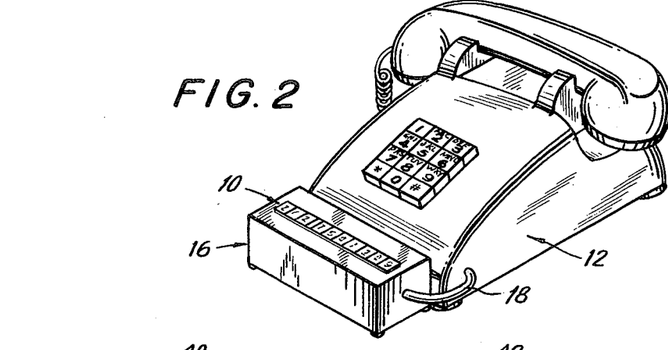
FIG. 2 is an isometric view of a standard telephone set with the present invention coupled thereto as an attachment unit.

As shown in FIG. 2, the optical readout of the present invention can also be provided as a separate attachment unit 16 which can be mechanically coupled to the telephone set 12 by means of snaps, screws, or other fasteneing means. The electrical control circuit of the optical readout would be included in the attachment unit 16 and would be electrically coupled to the telephone dialing equipment in the telephone set 12 by means of the electrical coupling 18. In this embodiment, the attachment can be added onto any existing telephone set in current use.

The optical readout display 10 can be of any well known type, for example the type used in small calculators. These displays are capable of providing numeric optic display by means of energizing appropriate terminals of the display device. Frequently, such displays include a plurality of individual optical devices, each with its own terminals which can be individually energized to cause it to display the desired number. Such optical devices are frequently made out of light emitting diodes, gas display tubes, charge coupled devices, etc.

Figure 3:
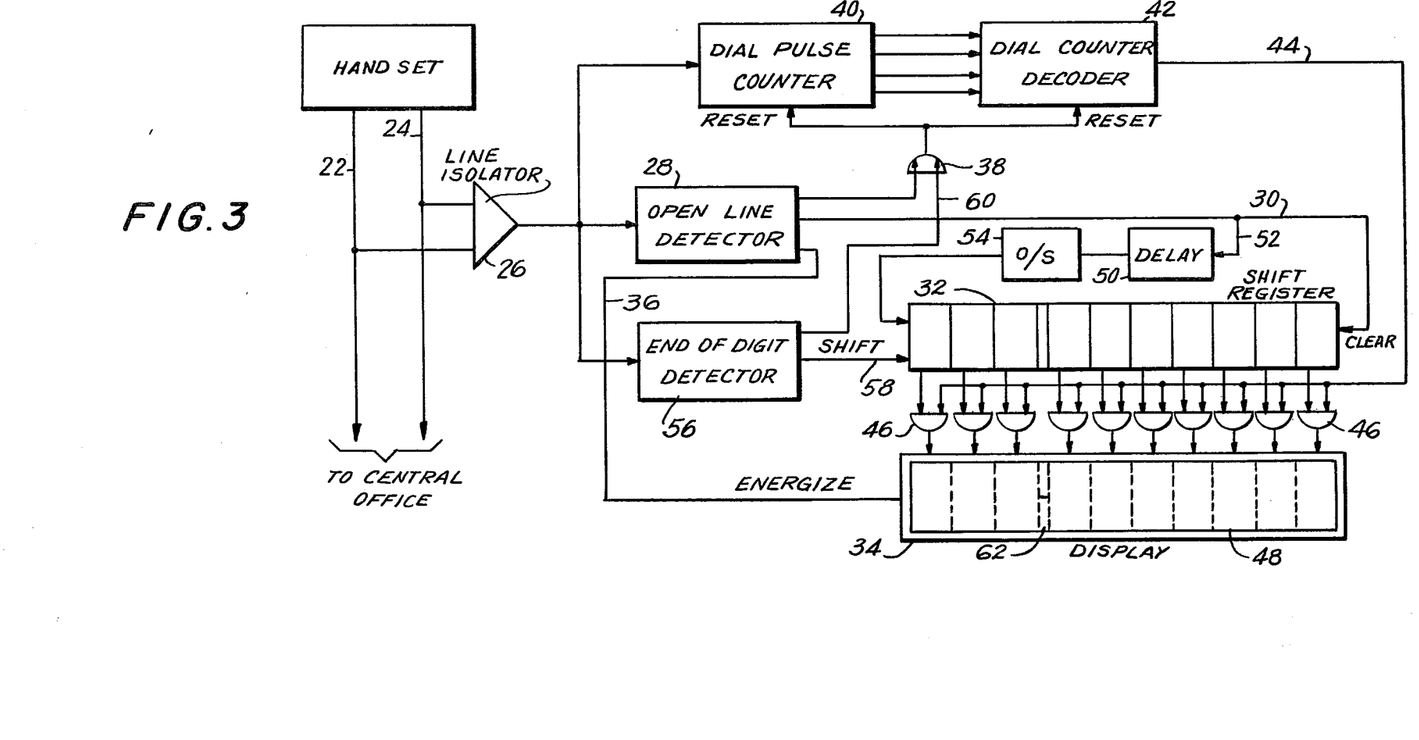
FIG. 3 is a block diagram of one embodiment of the circuit of the present invention.

Referring now to FIG. 3, there is shown one embodiment of electrically connecting the optical display to the telephone set such that it will respond to the telephone number entered onto the telephone set. It is understood, however, that this merely represents one of the embodiments, and is intended to include variations thereof. The present invention includes the basic conecpt of using an optical readout display for a telephone number entered; as well as the particular embodiments described for carrying out such basic concept.

In FIG. 3, the standard telephone handset 20 is shown connected to the telephone lines 22, 24 which then interconnect to the central office or other exchange. The opitcal readout of the present invention is coupled to the telephone lines 22, 24 through line isolator 26 which serves to isolate the telephone lines from the display unit and can be of the type supplied by the telephone company or can be an amplifier with a high input impedance. The signals from the telephone lines pass through an open line detector 28 which provides a high level output signal upon detection of an open line when the receiver is lifted off the cradle of the handset. The high level output signal is passed along line 30 to clear shift register 32. The output also energizes the display 34 along line 36 and also passes through the OR gate 38 to reset the dial pulse counter 40 and the dial counter decoder 42. As a number is dialed from the handset and is passed onto the telephone line 22, 24, the dial pulse counter 40 counts the number of pulses and the dial counter decoder 42, connected to the counter 40, decodes the number dialed. The decoder output passes along line 44 and simultaneously enters a series of AND gates 46. The other input to each of the AND gates 46 comes from a respective one of the positions of the shift register 32. The outputs from the AND gates 46 energize respective ones of the display devices 48 contained on the display 34.

The high level output from the open line detector 28 also serves to trigger the delay element 50 along line 52 and following the fixed delay a one shot multivibrator 54 is triggered which places a high level output into the first position of the shift register 32.

An end of digit detector 56 responds to the completion of a single digit being dialed and produces an output pulse which serves to shift the shift register 32 one position to the right along line 58 and also provides one input to AND gate 38 along line 60 to reset the dial pulse counter 40 and the dial counter decoder 42.

The operation of the circuit shown in FIG. 3 is as follows. When a subscriber lifts up the arm from the cradle of the handset, the telephone line is seized. The opening of the line is detected through the line isolator 26 by the open line detector 28 and in response thereto energizes the display 34, resets the dial pulse counter 40 and the dial counter decoder 42 and clears the shift register 32. Then, after a delay set by delay circuit 50, a single pulse is placed into the first position of the shift register by means of the one shot 54. When the subscriber then enters the first digit on the handset, this digit will be placed on the line. As is well known, the dialing of a digit causes a series of pulses at a fixed rate of about 10 or 20 pulses per second. The time between the dialing of successive digits is substantially longer than the rate of pulses forming a digit, typically a few seconds. Accordingly, as a digit is dialed onto the handset, the dial pulse counter 40 counts the number of pulses dialed. The decoder 42 decodes the number of pulses and determines the exact digit dialed. This number is then sent simultaneously to all of the AND gates 46. However, the only AND gate that will be energized will be the AND gate which has its other input connected to the stage of the shift register having the pulse therein. In this case, since only the first position of the shift register has a pulse, the digit dialed will be sent to the first position of the display 34 and the first optical display device will now optically represent the digit dialed.

After a first digit has been dialed, the delay between the dialing of digits will be detected by the end of digit detector 46 which will reset the dial pulse counter and the dial counter decoder and will also shift the shift register to now cause the pulse to be in the second position. Therefore, when the second digit is dialed on the handset and placed onto the telephone lines, the second digit will now be counted by the dial pulse counter 40, decoded by the dial counter decoder 42, and then placed on the second position of the display 34 corresponding to the second position of the shift register 32 which now contains the pulse. In this manner, the number dialed will appear on the display simultaneously with its being entered onto the telephone line and will appear in the same sequence as is has been dialed.

The length of the display as well as the length of the shift register is made such that it can accommodate both telephone numbers with area codes as well as those without. Thus, by way of example, there would be included at least ten digits in the display to accommodate the telephone number dialed with the area code. However, should a number be dialed without the area code, only seven of the digits would be displayed, the last three would not be displayed at all. Since in every telephone number, whether it be with or without an area code, a dash frequently appears after the first three digits, the display device can include a fixed dash 62 positioned between the third and fourth digits on the display. This will be an aid to viewing the telephone number dialed.

After the subscriber has dialed the number onto the line, there is usually an interval during which the number rings at the other end of the line until the other party picks up the telephone. During this interval, the subscriber can look at the display and note whether he has in fact dialed the number which he desires to reach. Should he find that the number was incorrectly dialed, he can immediately hang up the phone and redial. In this manner, he will avoid reaching a wrong party and will avoid both the cost and expense involved in connecting wrong numbers. At the same time, as he dials individual digits, he may find that during the course of his dialing he has dialed one particular digit in error. He need not wait until the complete number has been dialed but may immediately hang up the phone and start again to dial the proper number.

Figure 4:
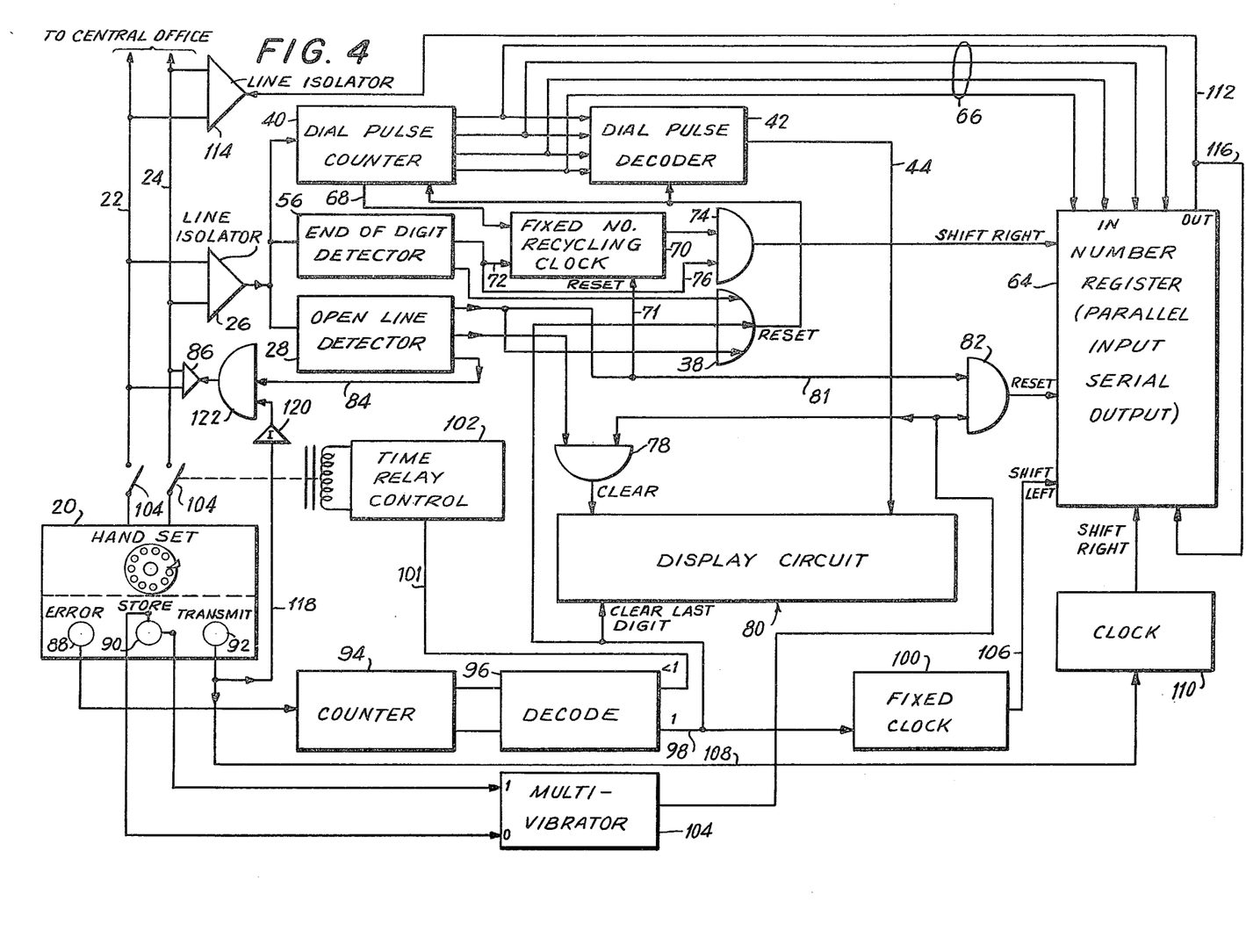
FIG. 4 is a block diagram of the circuit of the present invention including the memory feature.

Referring now to FIG. 4, there is shown another embodiment of the control circut of the present invention including additional features of a storage memory which permits error correction as well as permitting retransmission of the number dialed should the party not answer. In FIG. 4, like parts from FIG. 3 are identified in a like manner and only the additional circuits will be described.

In FIG. 4, the output from dial pulse counter 40 feeds the register 64 through parallel lines 66. The register can be a parallel input serial output type register. The numbers therefore enter in parallel to occupy each digit position, but can be read out in series. During the time that the dial pulse counter operates, a constant operating signal is fed on line 68 to a clock 70 which is a constant counting clock which recycles itself. Thus, it begins counting and continues to count for a fixed number of clock pulses and then recycles itself to commence counting again. The clock 70 is also fed on lines 72 from the end of digit detector 56. The output from the clock 70 enters AND gate 74, the other input to the AND gate 74 is from the end of digit detector 56 along line 76. The output from AND gate 74 provides a shift right pulse to the register 64.

The output from the open line detector 28 passes through AND gate 78 to the display circuit shown generally at 80. The display circuit can include the display devices, the shift register, and the associated AND gates as was described in FIG. 3. Alternately, display circuit 80 can include any display device with a control circuitry such as to permit the sequential energization of individual display devices in a consecutive order to place the number dialed into a sequence on the display device.

The open line detector 28 also provides an output on line 81 to AND gate 82, the output of which serves to reset the number register 64. The open line detector 28 also has an output on line 84 which passes through AND gate 122 and the line isolator 86 onto the telephone lines 22, 24. This signal places an open line onto the telephone lines.

The handset 20 in the present embodiment can include thereon, or in a separate attachment, three buttons; an error button 88, a two position button or a switch 90, which includes a first position marked "Store" and a second position marked "Clear", and a transmit button 92. The output from the error button 88 passes through a counter 94 to a decoder 96. The decoder has one output when the number decoded is a "one". This output along line 98 passes through a fixed clock 100 which produces a fixed number of output pulses serving as shift left signals to the number register 64. The output on line 98 also serves to clear the last digit on the display circuit 80 and also passes through OR gate 38 to provide a reset signal for the dial pulse counter 40 and the decoder 42. For any number decoded on the decode 96 which is greater than "one" the output appears on line 101 which triggers a timed relay control 102 to control the series switches 104 placed on the telephone lines 22, 24 to disconnect the line and after the timed interval to reconnect it again.

The output from the "store" position of the switch 90 and the output from the "clear" position of the switch 90 respectively are connected to the "zero" and "one" inputs of a multivibrator 104. The pulse output from the multivibrator passes along line 106 to respectively one input of AND gate 82 and AND gate 78.

The output from the transmit button 92 passes along line 108 to a clock 110 which provides shift pulses to shift the number register 64. As the number register is shifted by these clock pulses, the number stored passes through the output of the number register along line 112 through the line isolator 114 and onto the telephone lines 22, 24. The number also recirculates along line 116 and re-enters back into the circulating number register 64.

The operation of FIG. 4 will now be described. When the arm is removed from the cradle of the handset 20, the telephone lines will be seized. Simlutaneously therewith, the open line detector 28 will sense the seizing of the line and in response thereto will reset the number register along line 80, and through OR gate 38 will reset the dial pulse counter 40 and the decoder 42. The clock 70 will also be reset along line 71. The open line detector 28 will also provide an output on line 84 which will act as a telephone extension signal onto the telephone line and keep the line open. As is well known, when two telephone extensions are both open, although dial pulses can be dialed on one of the extensions and although a dial tone will be heard on the extensions, the dial pulses will not be entered onto the telephone line. The use of the signal on line 84 will serves as an extension phone which will prevent the pulses from being sent onto the telephone line by the handset, but yet will permit the handset to dial the pulses. The output will appear on line 84 and onto the line since the transmit button not being energized, the output being zero, such output will be inverted by the inverter 120 which will open the gate 122.

The switch 90 on the handset will normally be in a "clear" position which will provide a "one" output from the multi-vibrator 104 which will open gates 82 and 78 permitting the open line detector 28 to clear the display circuit 80 as well as reset the number register 64.

As a first digit is dialed onto the handset, the number of pulses will pass through and be detected by the pulse counter 40. However, as theretofore explained, the pulses will not be transmitted onto the telephone line itself. The pulses from the counter 40 will pass in parallel along lines 66 to be stored in number register 64. Also, the decoder 42 will decode the pulses and send the number along line 44 to be displayed by the display circuit 80, as was heretofore described.

During the time that the dial pulse counter operates, it will cause the clock 70 to begin cycling and counting pulses. The pulses will appear at gate 74 but will not be passed through the gate. When the pulse counter stops counting, the clock will also stop cycling. At that point, the end of digit detector 56 will detect that the first digit has been ended. It will then reset the dial pulse counter 40 and the decoder 42. Also, its output on line 72 will cause the clock to continue counting until it reaches the end of cycle. This time however, the output from the clock 70 will pass through the gate 74 which has been enabled by the end of digit detector along lines 76. These pulses will then be sent to the number register to shift it right. When the clock reaches the end of its fixed count, it will stop counting and will recycle back to zero and be ready to start again when triggered to start by the dial pulse counter 40.

By using the fixed recycling clock, the number register will have a fixed number of positions for each dialed digit. Thus, the number of positions in the clock 70 is set to be larger than the maximum capable of being dialed. If the maximum number of pulses capable of being dialed is 10, then, by way of example, the clock can count up to 15. In this way, should, for example, the number 5 be dialed on the handset, 5 pulses will be stored in the number register. The clock 70, however, will provide additional 10 shifts to the number register 64 so that a total of 15 positions have been assigned to that first digit. If, for example, the number 9 were dialed on the handset, 9 pulses would be stored in number register 64 and the fixed clock 70 would provide an additional 6 shift pulses so that again a total of 15 positions will be utilized for that digit.

After the entire number has been dialed, the number can be viewed on the display circuit to be sure that the proper number desired has in fact been dialed. It is noted that this number, although dialed, has not been placed on the telephone line but has only been stored in the number register 64. Should the subscriber now determine that the proper number has been dialed, the transmit button 92 is depressed. This causes the clock 110 to begin counting which will now shift the number out of the number register and place it onto the telephone line through the line isolator 114. The number will also recirculate on line 116 to be again stored into the number register. While the number, when dialed on the handset was prevented from entering onto the line because of the open line through isolator 86, that open line is now removed since the depressing of the transmit button 92 will provide an output pulse which will be inverted by inverter 120 and close off the AND gate 122 thereby removing the open line and permitting the pulses from the number register to be sent onto the telephone line. It will be noted from FIG. 4 that the conventional telephone set is directly coupled to the telephone line and that the attachment of the present invention is connected in parallel between the telephone set and the telephone line analogously to an extension.

If the subscriber is dialing a number and during the course of the dialing detects that the last number displayed was in fact in error, the subscriber need not hang up and redial again but need only to depress the error button a single time. The single pulse produced will be counted by the counter 94 and decoded by the decoder 96. Because only a single depression of the error button caused a single pulsed to be decoded, the output will appear on line 98 which will cause the last digit to be cleared from the display circuit and will also cause the dial pulse counter 40 and decoder 42 to be reset through the OR gate 38. The output on line 98 will also cause the fixed clock 100 to shift the number register 64 in the opposite direction from which it normally stores. The fixed clock 100 is set at the same number of clock pulses as the clock 70. Thus, for the example heretofore described, such clock would be set at 15 positions. It would therefore cause the number register to shift left 15 positions thereby clearing the last digit stored. By utilizing the same number of clock pulses on clock 70 and 100, it is possible to shift the number out of the number register 64 regardless of how many pulses were included in the number since there will always be assigned the same number of pulses for each digit regardless of the digit number dialed.

Therefore, by using the error button and depressing it a single time, the last number displayed will be removed and the last number stored in the number register will also be wiped out. Should the subscriber, however, want to completely wipe out the number dialed, he need only depress the error button more than once. Such depression more than once will produce a plurality of output pulses which will be decoded by decode 96 and produce an output on line 100. This will energize the relay control 102 to open the usually closed series switches 104 thereby disconnecting the line temporarily. After a predetermined fixed period of time the line will again be seized by means of closing switches 104. Of course, it is understood, that the subscriber may just as well hang up the arm onto the cradle and then pick it up again to begin dialing once more.

Should the subscriber have dialed the number, checked if for accuracy on the display, cause it to be transmitted onto the line and then receive a busy signal, the present embodiment provides a facility permitting automatic redialing of the number at the control of the subscriber. When the subscriber finds that he has received a busy signal he need only turn the button 90 to its store position and he can then hang up the arm onto the cradle. With switch 90 in its store position, it places a zero output on the multivibrator which causes AND gates 82 and 78 to close. Therefore, the next time the subscriber lifts the arm from the cradle, the open line detector 28 sensing the open line will reset the remaining parts of the circuit but will not be able to reset the display circuit 80 nor the number register 64. Therefore, the number previously stored by means of a previous dialing will remain memorized in both the display circuit as well as the number register. At some later time, when the subscriber desires, he need only pick up the arm from the cradle of the handset, press the transmit button, and the number previously memorized and displayed will automatically be sent onto the line again. The subscriber can repeat this procedure for as long as he desires until he turns the switch 90 to its clear position whereby the next time he picks up the arm from the cradle the display circuit 80 and a number register 64 will be cleared and will be available for receiving a new number being dialed.

Figure 5:
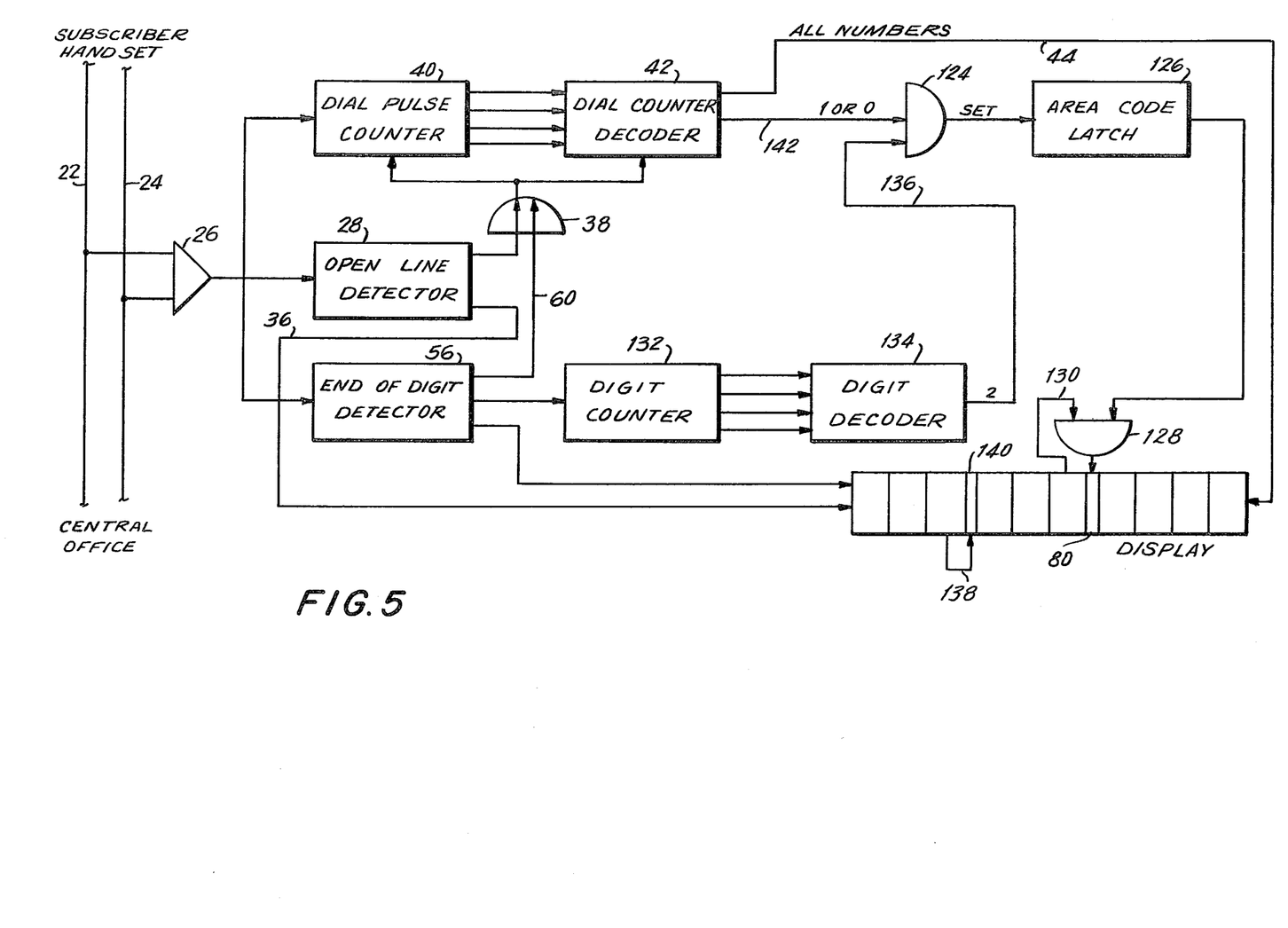
FIG. 5 is a block diagram of a circuit of the present invention including the area code detecting feature.

Referring now to FIG. 5 there is shown an additional embodiment providing the feature of area code detection. Like numbers of FIG. 5 represent like parts of FIGS. 3 and 4. In FIG. 5, a "one" or "zero" output from the decoder 42 passes through AND gate 124 which provides a set signal onto area code latch 126. The output from area code latch 126 upon detecting an area code serves as one input to AND gate 128. The other input to AND gate 128 comes from the sixth digit of the display 80 along line 130. The output from AND gate 128 energizes the seventh position of the display 80.

The output from the end of the digit detector 56 also passes through the digit counter 132 into the digit decoder 134. A number "two" being decoded from the decoder 134 provides the other input on line 136 to AND gate 134. The output from the third digit of the display 180 enters an additional space 140 of the display along line 138 to energize it.

The operation of FIG. 5 is as follows. When a line has been seized by the handset, the open line detector 28 sets the display 80 along line 36 and resets the counter 40 and decoder 42 through OR gate 38. As a digit is dialed onto the line, the dial pulse counter 40 counts the number and sends it to the decoder 42. The number passes on 44 to the appropriate position of the display 80 to be optically displayed and viewable by the subscriber. Simultaneously, a "one" or "zero" output from the decoder provides an output along line 142.

When an end of digit is detected by the detector 56, the counter 40 and decoder 42 are reset through OR gate 38. The digit counter counts the number of the digits and the count is decoded on decoder 134. When the second digit dialed has been decoded the gate 128 is enabled such that if a "one" or "zero" has been dialed for the second digit, the area code latch 126 will be set. As is well known with current telephone dialing systems, the second digit of an area code is always a one or a zero. On the other hand, in any other telephone number not having an area code the second digit will never be a one or a zero. Therefore, should a one or zero be detected in the second digit decoded, it is readily understood that that number has been an area code and area code latch 126 will produce an output pulse. This will then enable gate 128 such that after the sixth digit has been dialed, the gate 128 will pass a pulse through the seventh position which will cause a dash to be placed in the seventh position. Since under all circumstances, regardless of whether an area code or normal number has been dialed, after the third digit a dash usually appears, the display will cause a dash to automatically appear in position 140 after the third digit has been dialed. Therefore, the number displayed will include proper dashes. For a number without an area code and having only seven digits, a single dash will appear between the third and fourth digits. For an area code number, two dashes will appear, the first after the third digit and the second dash after the sixth digit. The number appearing with the dashes makes it easier for the subscriber to ascertain whether the number dialed was the same as the number being displayed.

Figure 6:
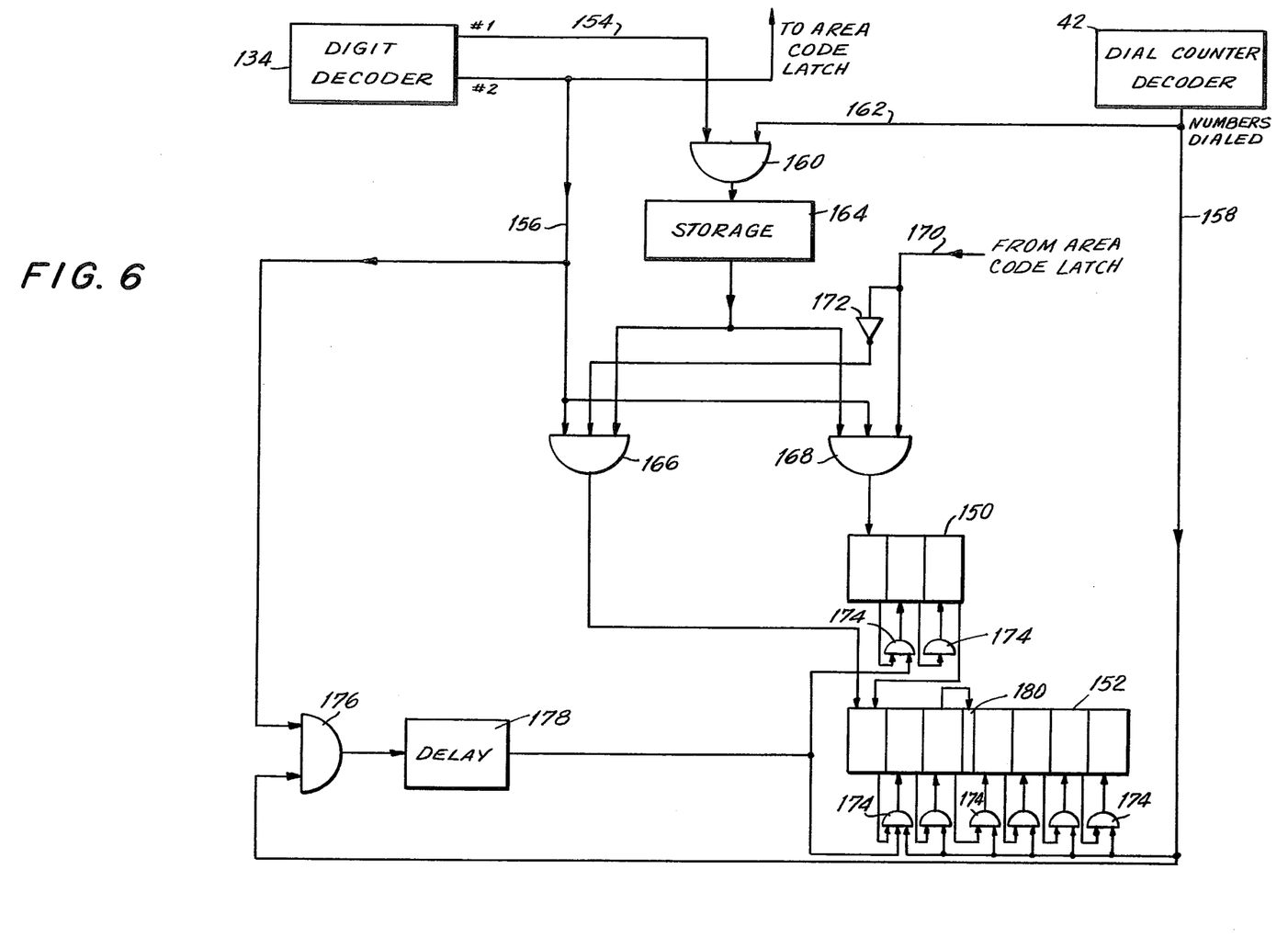
FIG. 6 is a diagram showing a modification of FIG. 5.

In FIG. 6 there is shown a modification of the display of FIG. 5 wherein the display is separated into two groups. The upper group 150 contains three digits and the lower group 152 contains 7 digits. When a number is dialed which contains an area code, the first three digits, representing the area code, will appear in the display 150 and the remaining seven digit telephone number will appear in the display 152. If a telephone number is dialed without an area code, the upper display 150 will remain blank and the telephone number will appear only in the lower seven digit display 152.

The output from the digit decoder 134 will indicate a signal on line 154 when the first digit has been dialed and an output on line 156 when the second digit has been dialed. As was described in connection with FIG. 5, the output from line 156 will also be utilized for the area code latch wherein a latch signal will indicate that an area code has been dialed. The dial counter decoder 42 decodes the actual number dialed and produces an output on line 158. When the first digit has been dialed, the output on line 154 will open gate 160 so that the actual number dialed will pass through the gate 160 along line 162 and be stored in the number storage 164. The number dialed will not be able to pass through any other gate since no other gate is enabled. The first number dialed is then stored in the number storage 164 until after the second digit has been dialed. The second digit, being the one to determine whether an area code has been dialed, will then indicate where in the display the first number shall be stored, i.e., in the first digit of the display 150 or the first digit of display 152.

When the second digit is dialed, the output on line 156 will enable both gates 166 and gate 168. If an area code has been dialed, a signal will appear on line 170 from the area code latch. This signal will open gate 168 to permit the number stored from the number storage 164 to pass through gate 168 and be entered to the first digit of display 150. Gate 166 will not be enabled since the signal from the area code latch on line 170 will be inverted by inverter 72 and will close the gate 166. If, on the other hand, there was no signal from the area code latch, then gate 168 would be closed and gate 166 would be opened whereby the first number dialed which had been stored temporarily in the number storage 164 will now pass through gate 166 and be entered into the first digit of display 152.

As a number is entered into the display, the energization of that digit of the display provides an input to one of the AND gates 174 to permit the next numeral dialed to pass through the next AND gate and enter into the next digit of the display. Thus, if the first number dialed has been stored in the first digit of the display 150, then the AND gate fed from that first digit will then enable the storage of the next number dialed into the second digit of the display 150. Similarly, if the first number dialed is stored in the first digit of the display 152, the next number dialed will be stored adjacent thereto in the display 152.

When the second digit is decoded, the output on line 156 is also sent to open gate 176 so that the second number dialed can now pass through gate 176. This number will then be slightly delayed by the delay 178 and then will pass either into the second digit of the display 150 or the second digit of the display 152, depending upon whether an area code had been dialed or not.

It will therefore be evident, that in the embodiment of FIG. 6, when the first number is dialed, it is not immediately entered into the display. Instead, it is stored temporarily until the second digit is dialed and a determination is made whether an area code has been dialed or not. At that point the first number is displayed in the appropriate digit display. The second number is slightly delayed until completion of display of the first number and then second number will be displayed. All subsequent numbers will automatically be displayed at the time they are dialed and will sequentially appear in the display.

As a result, if an area code has been dialed, that number will appear in the display 150 and the full telephone number will appear in display 152. If no area code was dialed, the entire number will appear in the display 152. In either event, the dash will appear in the space 180 to separate the first three digits of the display 152. By utilizing the embodiment shown in FIG. 6, it is easy for the dialer to check his number dialed since the area code will appear separately and the number will appear separately.

Although the display shown in FIG. 6 has been separated into two sections, it is evident that the section 150 could be placed at the left of the section 152 and made into one continuous strip. In that event, if a number with an area code has been dialed then the entire number will appear consecutively filling all ten digits of the display. If, on the other hand, a number without an area code has been dialed, then only the rightmost seven digits will be utilized for the number, the first three digits will remain blank While particular embodiments of the invention have been described with particular control circuitry, it will be understood that the broad concept of the present invention is the optical display of the number dialed on a telephone handset. Various other control circuits could produce the desired results.

For ease of explanation, the heretofore described circuits all use telephone sets with standard dialers. However, it is understood that a Touch-Tone dialer could be utilized in conjunction with a multifrequency to pulse converter of any type well known in the art. Accordingly, all references in this specification and claims to "dialing" or "entering" telephone numbers includes all forms of such dialing, including rotary dialers, Touch-Tone dialers, punch card dialers, etc.

There has been disclosed heretofore the best embodiment of the invention presently contemplated. However, it is to be understood that various changes and modifications may be made thereto without departing from the spirit of the invention.

We claim:

1. An attachment for a conventional telephone circuit that is directly coupled to a telephone line, comprising, housing means, numeric optical display means contained in said housing means, control circuit means in said housing means responsive to numbers entered onto the telephone circuit and controlling said display means to optically display the numbers entered and including open line detector means for detecting the state of said line, coupling means electrically connecting said control circuit means between said telephone circuit and the telephone line without physically disconnecting the telephone circuit from the telephone line, and memory means coupled to said control circuit means for storing the numbers entered onto the telephone circuit as they are being displayed, and wherein said control circuit means prevents the transmission of numbers from said telephone circuit directly onto the telephone line, said memory and display means storing and displaying the numbers entered onto the telephone circuit prior to their being transmitted onto the telephone line, and wherein said control circuit means also includes means under subscriber control coupled to said memory means for controlling the transmission of the stored numerical digits from said memory means onto the telephone line and reset means responsive to said open line detector for automatically resetting said memory means and override means for overriding said reset means to allow redialling of the stored number.

2. An attachment as in claim 1 and wherein said display means comprises a plurality of individual optical devices, said plurality being at least equal to the number of digits in a telephone number, and wherein said control circuit means sequentially operates said optical devices whereby the digits of a telephone number entered will appear in sequence on said display means.

3. An attachment as in claim 2 and wherein said control circuit comprises dial pulse counter means for counting the number of pulses being transmitted as a number is dialed onto the line, decode means for decoding said number of pulses counted, shift register means, means responsive after a time delay to said open line detector for placing a pulse in the first position of said shift register, end of digit detector means for detecting the end of a digit being dialed and in response thereto shifting said pulse to the next position in said shift register, and a plurality of gate means each interconnecting a position of said shift register with a respective one of said optical devices, the output from said decode means simultaneously being coupled to said plurality of gate means, whereby only the gate interconnected to the shift register position containing said pulse will permit the output from said decode means to pass to its respective optical device.

4. An attachment as in claim 1 and further comprising error correction means for erasing the last digit displayed and the last digit stored.

5. An attachment as in claim 1 and further comprising error correction means for erasing the entire number displayed and the entire number stored.

6. An attachment as in claim 1 and wherein said override means retains the number stored in said memory means for a desired length of time under subscriber control during which the telephone set may close the telephone line.

7. An attachment as in claim 2 and wherein said display means further includes means for initially displaying each number on a respective one of the individual optical devices and retaining that number on the same optical device without any shifting, and dash control means for automatically displaying a dash after the third number is displayed on said display means.

8. An attachment as in claim 7 and wherein said control circuit means further comprises area code detecting means coupled to said dash control means for detecting when an area code is entered onto the telephone set and in response thereto automatically displaying a dash after the sixth number displayed on said display means.

9. An attachment as in claim 1 and wherein said control circuit comprises a single dial pulse counter means for counting the number of pulses being transmitted as a number is dialed onto the telephone set, the output from said single counter means being coupled as the input to said memory means, end of digit detector means for detecting the end of a digit being dialed, fixed recycling clock means coupled to said memory means for shifting thereof, said clock being controlled by said end of digit detector means and said dial pulse counter means, and gate means preventing the clock from shifting said memory means when said dial pulse counter is counting the number of pulses being transmitted, whereby said memory means will provide a fixed amount of storage for each number dialed independent of the number of pulses being transmitted for that number.

10. An attachment as in claim 1 and wherein said coupling means includes means for electrically inhibiting the transmission of numbers from the telephone set directly onto the telephone line without effecting the receipt of telephone calls by the telephone circuit directly from the telephone line, whereby said attachment operates analogously to an extension in parallel with the telephone circuit.

* * * * *